Aug. 1, 1961
H. J. KOEBER
2,994,232
CAMERA CRANK CONNECTION
Filed Oct. 5, 1959
2 Sheets-Sheet 1
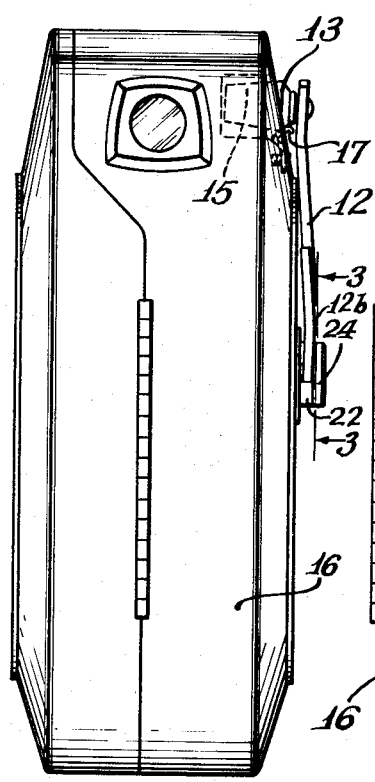
INVENTOR.
Henry J Koeber
BY
Robert F. Miehle
Atty.

Aug. 1, 1961  H. J. KOEBER  2,994,232
CAMERA CRANK CONNECTION
Filed Oct. 5, 1959  2 Sheets-Sheet 2
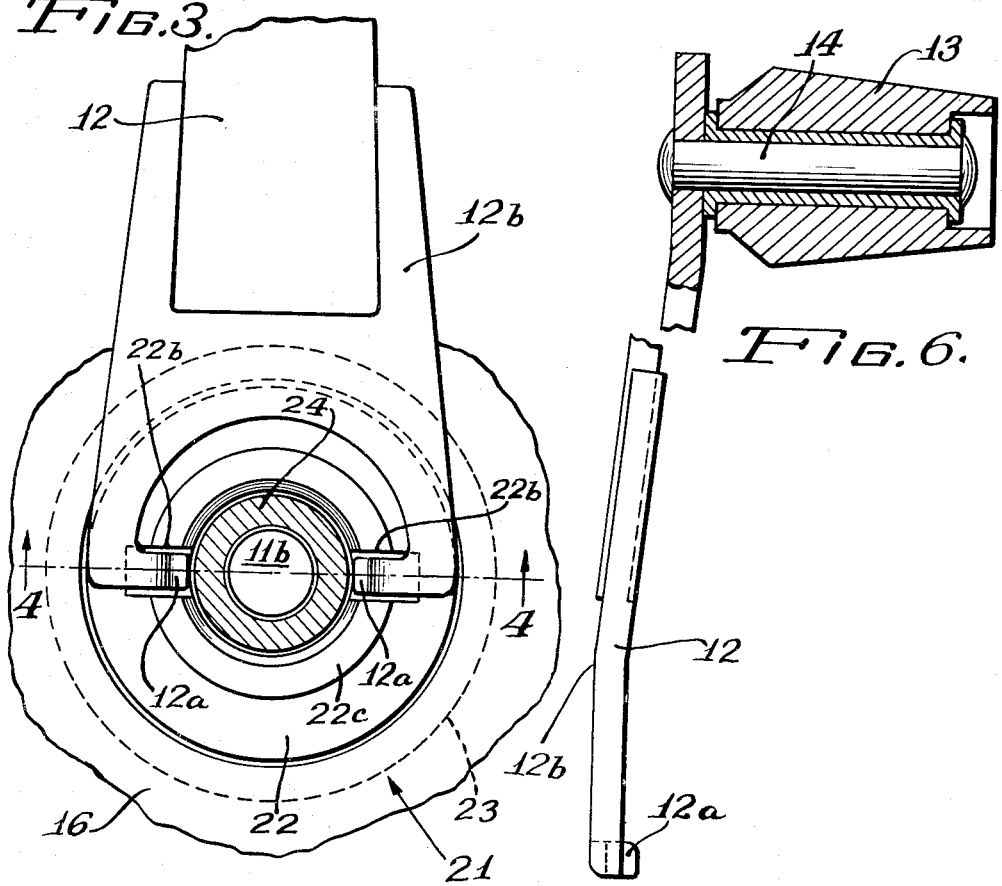
INVENTOR.
Henry J. Koeber
BY
Robert F. Michon
Atty.

2,994,232
CAMERA CRANK CONNECTION
Henry J. Koeber, Deerfield, Ill., assignor to Bell & Howell Company, Chicago, Ill., a corporation of Illinois
Filed Oct. 5, 1959, Ser. No. 844,478
7 Claims. (Cl. 74—548)

This invention relates to a camera, and more particularly to a spring winding device for a motion picture camera.

An object of the invention is to provide a new and improved spring winding device for a motion picture camera.

Another object of the invention is to provide a new and improved clutch mechanism between a crank arm and a driving spring of a motion picture camera.

Another object of the invention is to provide a motion picture camera spring wind-up including a handle which has a pair of camming fingers projecting into an annular groove in a spring-winding shaft and serving, when the handle is pivoted from a rest position to an operative position, to clamp the handle to the shaft for turning the shaft.

A complete understanding of the invention may be obtained from the following detailed description of a camera forming a specific embodiment thereof, when read in conjunction with the appended drawings, in which:

FIG. 1 is a rear elevation view of a camera including a spring-winding device forming one embodiment of the invention;

FIG. 2 is a side elevation view of the camera;

FIG. 3 is an enlarged, fragmentary, side elevation view of the spring-winding device;

FIG. 4 is an enlarged horizontal sectional view taken along line 4—4 of FIG. 3;

FIG. 5 is a view similar to FIG. 4 but with elements thereof in different positions;

FIG. 6 is an enlarged, fragmentary, edge view of a winding crank forming a part of the spring-winding device; and FIG. 7 is an enlarged, fragmentary, exploded, sectional view of the spring-winding device.

The invention provides a spring-winding device for a motion picture camera in which a strap-like crank handle has a pair of clutch lugs projecting from one face and into an annular groove in a shaft to be driven, the lugs serving, when one side of the handle is in a rest position lying against one side of the camera, to move freely relative to the shaft, and, when the handle is swung one half of a revolution to an operative position with the other face thereof against the camera, to grip the portion of the shaft forming one end of the groove and drive the shaft as the handle is turned. Preferably there is provided a thrust ring rotatable on the shaft and having slots for receiving the lugs when the handle is in its rest position to provide clearance between the handle and the shaft and permitting rotation of the lugs out of the slot and into engagement with the end of the groove when the handle is swung to its operative position. A spring washer in the groove transmits thrust from one end of the groove to the thrust member. Preferably the shaft includes a flanged nut forming the annular groove with a shoulder on the shaft and threaded on the shaft in a direction such that, as the handle is turned to wind the spring, the handle tends to tighten the nut on the shaft.

Referring now in detail to the drawings, a motion picture camera shown in FIGS. 1 and 2 includes a spring drive motor having a winding shaft 11 (FIGS. 4, 5 and 7), which may be turned in a spring-winding direction by a crank handle 12 when the handle is in its broken line or operative position as shown in FIG. 2 and is rotated clockwise. The handle may be swung about 180° from its operative position to its rest or retracted position as shown in full lines in which the handle is disconnected from the shaft 11 and a gripping knob 13 rotatable on pin 14 fixed to the handle projects into a socket 15 in camera housing 16 and is retained therein by spring detent 17 (FIG. 1).

A clutch 21 (FIGS. 4 and 5) is comprised of aligned lugs or finger-like projections 12a of the handle 12, a thrust ring or sleeve 22, spring washer 23, shoulder 11a of the shaft 11 and flanged cylindrical nut 24 threaded on reduced, threaded portion 11b of the shaft. When the handle 12 is in its rest position, the clutch elements are in their declutched positions as shown in FIG. 4, in which the lugs 12a enter recesses 22a at the inner ends of aligned slots 22b formed in reduced end portion or boss 22c of the thrust ring 22. In this rest position, the handle 12 is only lightly, if at all, in contact with flange 24a of the nut 24, and the shaft 11 with the nut 24 may rotate freely relative to the handle, the thrust ring 22, the washer 23, and a housing 25 of the camera mechanism. The shaft projects through bearing hole 25a, which is lubricated by a lubricant saturated porous washer 26 of felt or the like.

To wind the spring motor, the handle 12 is swung to its operative position as shown in FIG. 5 and broken lines in FIG. 2, the outer end of the handle being bent at 12b outwardly away from the camera housing 16. This causes clutching between the handle and the nut 24, faces 12c being thrust hard against flange 24a of the nut 24 by the spring washer which bears against the shoulder 11a and against annular rim 22d of the thrust ring and face 22d bears against arms 12d of the handle which form a yoke which clears the boss 22c in both positions of the handle. Then, as the handle is rotated, the strong gripping engagement of the lugs 12a on the flange of the nut turn the nut and the nut, being pulled strongly along the shaft, turns the shaft. The direction of rotation of the handle to wind the spring tends to thread the nut farther on the shaft to tighten the nut sufficiently for a sufficiently strong clutching force to wind the spring. When the spring is fully wound, the lugs 12a slip relative to the nut without overwinding the spring. A clearance hole 16a is provided in the housing to permit free rotation of the thrust ring 22 with the handle and shaft. As illustrated in FIG. 7, the lugs 12a have rounded corners 12d and the arms 12c have rounded corners 12e to facilitate swinging the handle between its rest and operative or clutching positions, the flat faces 12 having an overcenter locking function when in engagement with the flange 24a of the nut.

The above winding mechanism is rugged and durable while being simple, inexpensive and efficient. The clutch provides a strong winding force while permitting slipping when the spring is fully wound.

While the invention is thus described, it is not wished to be limited to the precise details described, as changes may be readily made without departing from the spirit of the invention.

What is claimed is:

1. In a winding device for a motion picture camera, spring-winding shaft means having an annular abutment extending from the periphery of an end portion thereof and also having a second abutment spaced along the shaft means, from the annular abutment and projecting from the periphery of said end portion, a thrust ring rotatable on and slidable along said end portion of the shaft means between the abutments, the ring having a boss provided with a pair of recesses in one face thereof, and a winding handle having a pair of arms each having a lug, the lugs extending from the arms toward one another and also projecting beyond one side of the arms, the recesses in the boss serving to receive the lugs to mount the handle pivotally on the ring, the handle being pivotal between a driving position in which the lugs project beyond the boss to frictionally engage the annular abutment for frictionally driving the shaft means and a rest position in which the lugs are contained in the recesses to permit free rotation between the shaft means and the handle.

2. The winding device of claim 1 and including spring means between the abutments for urging the lugs tightly against the annular abutment when the handle is in its driving position.

3. The winding device of claim 1 wherein there is provided a leaf spring washer seated at its inner portion on the second abutment, the thrust ring having an annular portion bearing against the outer portion of the washer.

4. In a winding device for a motion picture camera, a shaft having a reduced threaded end portion, a flanged nut threaded on the reduced end portion to define an annular groove with the shaft, a thrust ring slidable and rotatable in the groove and having a boss projecting from one face thereof and provided with aligned slots in one end thereof, and a handle having a forked end provided with inwardly projecting laterally offset lugs extending into and pivotal in the slots, the handle being pivotal between a rest position in which the lugs project from the handle away from the flange of the nut and a driving position in which the arms rest against said face of the ring and the lugs project out of the slots into frictional engagement with the flange of the nut for turning the nut and the shaft.

5. The winding device of claim 4 and including spring means urging the lugs toward the flange of the nut.

6. The winding device of claim 4 and including a spring washer on the reduced end portion of the shaft bearing against the inner end of the reduced end portion of the shaft and against the thrust ring.

7. In a motion picture camera, a shaft having a reduced threaded end portion, a nut threaded on the shaft to define an annular groove with one end of the reduced portion of the shaft and having a peripheral flange of a predetermined diameter, a thrust ring slidable and rotatable in the groove and having a body portion having an external diameter substantially larger than that of the flange and also being provided with a boss portion of substantially the same diameter as that of and aligned with the flange, the boss portion having aligned slots therethrough and the body portion having clearance recesses aligned with the slots, a spring washer on the reduced end portion of the shaft bearing against the end of the ring remote from the boss portion of the ring and against said one end of the reduced end portion of the shaft, and a handle having a forked end portion provided with aligned lugs rotatable in the slots and clearance portions and projecting to one side of the forked end portion, the recesses in the ring serving to provide clearance for the lugs when the handle is in a rest position and the lugs serving to drivingly engage the flange of the nut when the handle is turned from said one position to a driving position, the forked end portion of the handle having arms serving to rest on the body portion of the ring at the end of the boss portion thereof when the handle is in the driving position thereof, the arms of the handle being spaced apart sufficiently as to permit the handle to be pivoted over the nut when moved between the rest and driving positions thereof.

References Cited in the file of this patent

UNITED STATES PATENTS

| | | |
|---|---|---|
| 870,288 | Hartness | Nov. 5, 1907 |
| 870,327 | Ulrich | Nov. 5, 1907 |
| 1,999,457 | Hoehn | Apr. 30, 1935 |
| 2,165,060 | Krug | July 4, 1939 |
| 2,239,941 | Soulary | Apr. 29, 1941 |
| 2,574,689 | Christ | Nov. 13, 1951 |

FOREIGN PATENTS

| | | |
|---|---|---|
| 119,883 | Australia | Apr. 26, 1945 |